United States Patent [19]

Swidersky et al.

[11] Patent Number: 5,393,506
[45] Date of Patent: Feb. 28, 1995

[54] METHOD FOR THE MANUFACTURING OF ALKALI MONOFLUOROPHOSPHATE

[75] Inventors: Hans-Walter Swidersky; Werner Rudolph, both of Hanover; Ulrich Hartmann, Witzenhausen; Frank Moewius, Berlin; Veronika Radonz, Blankenfelde; Manfred Meisel, Berlin, all of Germany

[73] Assignee: Kali-Chemie Aktiengesellschaft, Hanover, Germany

[21] Appl. No.: 81,247

[22] PCT Filed: Dec. 24, 1990

[86] PCT No.: PCT/EP90/02304

§ 371 Date: Oct. 7, 1993

§ 102(e) Date: Oct. 7, 1993

[87] PCT Pub. No.: WO92/11201

PCT Pub. Date: Jul. 9, 1992

[51] Int. Cl.$^6$ ............................................. C01B 25/10
[52] U.S. Cl. .................................................... 423/301
[58] Field of Search ........................................ 423/301

[56] References Cited

U.S. PATENT DOCUMENTS 3,463,605  8/1969  White et al. .................... 423/301
4,374,108  2/1983  Nakaso et al. ................... 423/301

FOREIGN PATENT DOCUMENTS 1667413   4/1970  Germany ......................... 423/301
181710   10/1983  Japan ............................. 423/301
6804958  10/1968  Netherlands ..................... 423/301
1186664   3/1968  United Kingdom ................ 423/301
1288972   9/1972  United Kingdom ................ 423/301

*Primary Examiner*—Wayne Langel
*Attorney, Agent, or Firm*—Evenson, McKeown, Edwards & Lenahan

[57] ABSTRACT

In a method for manufacturing alkalimonofluorophosphate of general formula $M_2PO_3F$(I), where M stands for the cation of a metal of the first main group of the periodic system, in particular potassium, a reaction mixture containing alkali metal cations M, phosphate, fluoride, particularly in the form of alkali hydroxide, phosphoric acid and hydrofluoric acid, and water, the molar ratio of M:P:F being $(2\pm0.1):(1\pm0.05):(1\pm0.1)$ and the molar ratio of water:P being at least 1:1, is heated to a temperature of 150° C. to 400° C. Alkalimonofluorophosphate of general formula (I) occurs, with evaporation of water, as a reaction product, which is then isolated.

19 Claims, 1 Drawing Sheet

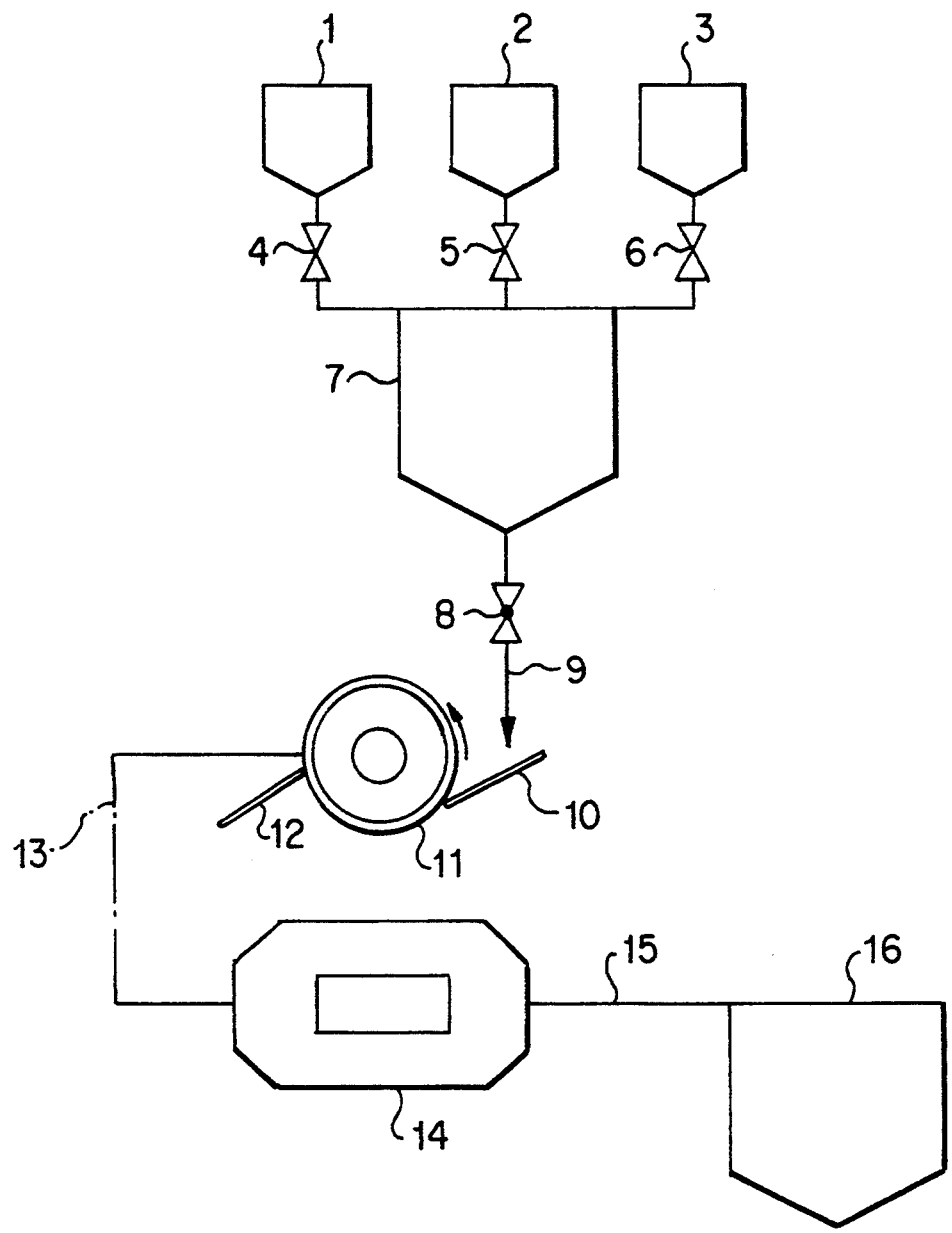

METHOD FOR THE MANUFACTURING OF ALKALI MONOFLUOROPHOSPHATE

The invention relates to a method for manufacturing alkali monofluorophosphate of the formula $M_2PO_3F$. Alkali monofluorophosphates, such as potassium fluorophosphate, are used as fluorine carriers in toothpastes or drinking water. Alkali monofluorophosphates also have a fungicidal and insecticidal effect and are therefore also used in wood preservatives. Furthermore, alkali monofluorophosphates are valuable intermediate products for the manufacturing of other monofluorophosphate compounds which, for their part, are used in wood preservativese such as monofluorophosphate compounds containing copper and zinc.

It is known that, for the manufacturing of alkali monofluorophosphates, anhydrous phosphates can be caused to react with fluorides at a very high temperature, usually above 600° C. The resulting corrosive melt requires corresponding equipment expenditures for the reactors.

The German Published Patent Application DE- B 1 224 280 relates to the manufacture of different metal fluorophosphates. Based on aqueous or anhydrous mixtures which contain metal kations, phosphorus and fluorine at alternating ratios, by means of the reaction at temperatures of up to 800° C., reaction products are produced which contain the above-mentioned elements. The DE-B 1 224 280 contains nothing concerning the type of chemical compounds contained in the reaction products. A targeted teaching for the synthesis of defined metal fluorophosphates is not found, only information that according to the type and quantity of the starting materials of the reaction conditions, such as temperature and time, many different products are obtained.

It is an object of the invention to provide a technically simple method for the manufacturing of defined metal fluorophosphates, specifically alkali mono- rubidium monofluorophosphate, and cesium monofluorophosphate. These objects are achieved by means of the method according to the invention. The method according to the invention for the manufacturing of alkali monofluorophosphate of the general formula $M_2PO_3F$(I) is characterized in that a reaction mixture which contains alkali metal cations M, phosphate, fluoride and water—the molar ratio of M:P:F being $(2\pm0.1):(1\pm0.05):(1\pm0.1)$, and the molar ratio of water:P being at least 1:1 is heated to a temperature of from 150° C. to 400° C., the alkali monofluorophosphate of the general formula (I) being formed as the reaction product, and the reaction product being isolated, if desired, after an aftertreatment.

When, for example, a reaction mixture is reacted in which M stands for sodium, according to the method of the invention, sodium monofluorophosphate can be produced which has a purity of approximately 80% in weight. The other alkali monofluorophosphates are obtained with an even higher purity.

BRIEF DESCRIPTION OF DRAWINGS

FIG. 1 illustrates equipment which can be used to carry out the process of the present invention.

According to a preferred embodiment of the method according of the invention, pure alkali monofluorophosphates are manufactured. This preferred embodiment of the method according to the invention is characterized in that, for the manufacturing of a pure alkali monofluorophosphate of the general formula $M_2PO_3F$ (I), wherein M stands for potassium, cesium or rubidium, a reaction mixture which contains alkali metal cations M, phosphate, fluoride and water -the molar ratio of M:P:F being $(2\pm0.05):(1\pm0.05):(1\pm0.1)$, and the molar ratio of water:P being at least 1:1—is heated to a temperature of from 150° C. to 400° C., the alkali monofluorophosphate of the general formula (I) being formed as the reaction product while water is evaporated, and the reaction product being isolated, if desired, after an aftertreatment.

In the present invention, it is particularly preferred that "alkali" or M stands for potassium. The method according to the invention is particularly well suited for the manufacturing of potassium monofluorophosphate—$K_2PO_3F$.

When, in the following, for reasons of simplicity, "alkali monofluorophosphate" is mentioned, this term applies to compounds of the formula (I) which should correctly be called "dialkali monofluoromonophosphate".

Expediently, the amounts of starting compounds are selected such that the molar ratio of M:P:F is approximately 2:1:(1-1.1). In this manner, particularly pure alkali monofluorophosphates of the general formula (I) can be produced.

The ratio of water:P is preferably at least 2:1, for example, 2:1 to 100:1. Preferably, the ratio of water:P is at least 3:1. In a particularly preferred manner, an aqueous solution is used as the reaction mixture.

Aqueous solutions which contain approximately 11.9 to 14.7 mol of water for each mol of the $M_2PO_3F$ end product to be manufactured are excellently suitable for use as the reaction mixture.

When caustic potash solution, phosphoric acid and hydrofluoric acid are used as the basis, reaction mixtures are used, for example, which, in addition to KOH, $H_3PO_4$ and HF also contain 41 to 47.7% in weight of water. When a quantitative reaction to $K_2PO_3F$ is assumed, such a mixture will then still contained 11.9 to 14.7 mol of water per $K_2PO_3F$ to be manufactured.

The phosphate can be fed into the reaction mixture in many different manners. In principle, any compounds of the pentavalent phosphorus may be used that can be hydrolyzed to form phosphate. Compounds are expediently used which are constituted of pentavalent phosphorus, oxygen and possibly hydrogen and/or alkali metal or ammonium cations. Phosphorus pentoxide, phosphoric acid, dimeric, oligomeric or polymeric phosphoric acid as well as corresponding monobasic, bibasic or tribasic alkali or ammonium compounds may, for example, be used. Alkali dihydrogen phosphate, dialkali monohydrogen phosphate or trialkali phosphate may, for example, be used. Also usable are corresponding ammonium compounds, also polyphosphates, including hydrogen polyphosphates which are characterized by the general total formula $X_{(n+2)}P_nO_{3(n+1)}$, in which X stands for M and/or $NH_4$ and/or H and in which $n \geq 2$. Preferably in this case n is equal to 2 or 3. For a person skilled in the art it is self-evident that polyphosphates of a high molecular weight which cannot be reacted at a temperature of up to 400° C., such as Kurrol's potassium salt, which has a high molecular weight, cannot be used, but the water-soluble potassium polyphosphate described by Klement and Schmid, Z. Anorg. Allg. Chem. 290 (1957), Pages 113 to 132, may be used.

Also usable are cyclophosphates, including hydrogen cyclophosphates and cyclophosphoric acids which are characterized by the general total formula $X_nP_nO_{3n}$, in which X has the above-mentioned meaning and in which $n \geq 3$. In this case, n is preferably 3 or 4.

The phosphate is preferably fed into the reaction mixture in the form of phosphoric acid, alkali dihydrogen phosphate or dialkali hydrogen phosphate, particularly preferably in the form of phosphoric acid.

The alkali metal cation may also be entered into the reaction mixture in many different forms. Expediently, alkali compounds are used whose anion is volatile under the conditions according to the method of the invention, such as nitrate, oxalate or acetate, or is transformed into water in the course of the process of the invention. Alkali hydroxide, alkaline lye, alkali carbonate and alkali hydrogen carbonate are particularly suitable. Alkali hydroxide or alkaline lye are preferably used if M is sodium or potassium, and alkali carbonate is preferably used when M is cesium or rubidium.

The fluoride can also be entered into the reaction mixture in many different forms. It is expedient to use an alkali fluoride or an alkali bifluoride or a fluoride whose cation is volatile under the condition of the method of the invention, such as ammonium fluoride or ammonium bifluoride. If an alkali fluoride or an alkali bifluoride is used, the above-described other alkali compounds are used in such quantities that the ratio according to the invention of M:P:F is maintained (the analogous situation naturally exists if alkali phosphates are used).

Preferably, the fluoride is entered into the reaction mixture in the form of hydrogen fluoride, particularly in the form of an aqueous solution.

The water contained in the reaction mixture may be of different origins. It may, for example, be added as water; it may be fed as water of crystallization, water of constitution, as solvent water, for example in the form of an aqueous phosphoric acid, as alkaline lye and/or aqueous hydrofluoric acid, together with the starting materials.

It was found to be particularly advantageous to produce the reaction mixture by mixing phosphoric acid, particularly aqueous phosphoric acid, alkaline lye and aqueous hydrogen fluoride. It is particularly advantageous to produce the reaction mixture by mixing phosphoric acid, particularly aqueous phosphoric acid, alkaline lye and aqueous hydrogen fluoride and to keep the reaction mixture obtained in this manner, until the point in time at which, as indicated above, it is heated to a temperature of 150° to 400° C., at such a temperature that no solids will precipitate. In the case of mixtures of phosphoric acid, potassium lye and hydrofluoric acid, for example, a minimum temperature of 60° C. was found to be advantageous. Expediently, the exothermal heat development is utilized during the mixing of the starting compounds and the mixture is immediately reacted further.

Preferably the reaction mixture is heated to a temperature of at least 200° C. Very advantageously, the reaction mixture is heated to temperature of from 220° C. to 350° C.

During the heating, water evaporates; the starting compounds react with one another; and the desired alkali monofluorophosphate is formed.

The producing of the reaction mixture and the heating may take place in the same vessel. Expediently, vessels are used which are resistant to hydrogen fluoride, such as special-steel pots, platinum pots, aluminum vessels, or the like. However, it is difficult to remove the reaction mixture, which solidifies in the course of the reaction, from such vessels. Expediently, the still liquid reaction mixture is therefore heated in a flat manner.

This preferred method for the manufacturing of alkali monofluorophosphate of the general formula $M_2PO_3F$ (I), wherein M stands for the cation of a metal of the first main group of the periodic system of elements, is characterized in that a reaction mixture which contains alkali metal cations M, phosphate, fluoride and water -the molar ratio of M:P:F being $(2\pm 0.1):(1\pm 0.05):(1\pm 0.1)$, and the molar ratio of water:P being at least 1:1—is heated in a flat manner to a temperature of from 150° C. to 400° C., the alkali monofluorophosphate of the general formula (I) being formed, while water is evaporated, as the reaction product, and the reaction product being isolated.

For example, the reaction mixture may be produced in a vessel of any shape that is resistant to hydrogen fluoride and this reaction mixture may then be withdrawn onto heatable flat forms, such as metal sheets, and may be heated there. The separation of the solidified reaction product can then be carried out, for example, by means of self-supporting blades, such as scrapers or knives. The use of a mixing vessel is advantageous. However, the reaction mixture may also be produced directly on the heating form.

Technically, it is particularly advantageous to apply the reaction mixture to surfaces which are renewed continuously, for example, onto a circulating conveyor belt, such as a link conveyor, from which the solidified reaction product which is obtained during heating is detached, for example, by means of scrapers.

Particularly advantageously, the reaction mixture is applied to the surface of a roller as a continuously renewable surface. In this case also, the reaction mixture may be produced directly on the roller surface. Expediently, the reaction mixture is first produced in a vessel and the finished mixture is then applied to the roller surface.

This particularly preferred embodiment provides that the reaction mixture, which contains phosphate, fluoride and the alkali metal cation, is applied to the surface of a roller; is heated there to a temperature of at least 150° C., preferably 200° to 400° C., particularly preferably to a temperature of from 220° to 350° C., and the solidified reaction product is detached from the roller by means of a self-supporting blade. In this case, the reaction mixture must remain on the roller surface until the reaction mixture has solidified while alkali monofluorophosphate is formed, and a major portion of the water, for example, more than 70%, for example, 70 to 90 or even 100% in weight of the existing water, is evaporated.

If desired, the product may also be subjected to a drying aftertreatment at an increased temperature; expediently by heating it to temperatures of at least 280° C. to 400° C., preferably 300° to 350° C. This may take place, for example, in corresponding furnaces or by the use of appropriate radiation, such as infrared radiation. Surprisingly, not only the content of water is lowered during this aftertreatment, but the product is also clearly improved.

The method according of the invention permits the manufacture of alkali monofluorophosphates, particularly potassium fluorophosphate in a surprisingly pure state. The role of the water in the case of the method according to the invention has so far not been clarified, but it was found in a plurality of experiments that a pure monofluorophosphate is obtained only when the mentioned minimum amount of water is present. It is surprising that pure compounds can be obtained at all, because it is to be expected that water leads to the hydrolysis of the desired fluorophosphate.

In the following, an arrangement is described by means of which a very pure monofluorophosphate can be produced in a very simple manner.

In the following examples, the method according to the invention is to be explained in greater detail without limiting its scope.

EXAMPLES

General Information

For the experiments, chemicals with a pro analysis degree of purity were used, such as correspondingly pure phosphoric acid, caustic potash solution, hydrofluoric acid, dipotassium hydrogen phosphate. The sequence in which the starting compounds are mixed with one another for producing the starting mixture is not critical.

Equipment

Examples 1 to 5 were carried out in a platinum vat. Example 6 was carried out in equipment that is illustrated in FIG. 1. With reference to FIG. 1, this equipment will be explained further in the following. One storage vessel 1 is used for accommodating an alkaline lye; one storage vessel 2 for accommodating a phosphoric acid solution; and one storage vessel 3 for accommodating a hydrofluoric acid.

By means of valves 4, 5, and 6, storage vessels 1, 2, and 3 are connected with a mixing vessel 7. The mixing vessel 7, in turn, is connected with the pipe 9 by means of a valve 8. On its end, the pipe 9 has an opening which permits the feeding of the reaction mixture from the mixing vessel 7 onto an aluminum plate 10. This aluminum plate 10 is arranged to slope toward a roller 11 in such a manner that the reaction mixture which is applied to the plate 10 flows to the surface of the roller 11. The roller 11 can be rotated about a horizontal axis in direction indicated by an arrow. The reaction roller consisted of a cylinder which can be heated on the inside by means of thermo-oil; has a thickness of 2 cm, a length of 48 cm and an inside diameter of 38 cm. The rotating speed of the roller is expediently adjusted in such a manner that it requires approximately 20 sec. to 2 min. for one rotation. By way of the aluminum plate, the reaction mixture may be applied along the whole width of the roller surface. By means of a self-supporting special-steel blade 12, which may be pressed against the roller by hydraulically operated presses which are not shown, the hot solidified reaction product is detached from the roller surface. The aluminum plate 7 and the special-metal blade 12 are arranged to be movable. The angle between the aluminum plate 10 and the special-steel blade 12 (the roller axis is the point of intersection) expediently amounts to between approximately 90° and 270° C., viewed in the running direction of the roller. By way of the blade 12, which is expediently arranged to fall away from the roller, the reaction product is placed onto a conveyor belt. The conveyor belt 13 is connected with a heating oven 14. The oven 14 is connected with the conveyor belt 15 and a storage vessel 16.

Methods Of Analysis

Method a) $^{19}$F-NMR Spectroscopy.

By means of chemical displacement and possibly the splitting pattern (coupling with the phosphorus atom), this method of analysis permits the quantitative determination of a possible contamination of the desired monofluorophosphate with fluoride and difluorophosphate.

Method b) $^{31}$P-NMR Spectroscopy.

By means of chemical displacement and possibly the splitting pattern (coupling with the fluorine atom or atoms), this method of analysis permits the quantitative determination of a possible contamination of the produced monofluorophosphate with phosphate or difluorophosphate.

Method c) Quantitative Paper-Chromatographic Analysis According to Rössel.

This method permits the quantitative determination of possible other phosphates in addition to the desired monofluorophosphate.

A description of this method is found in R. Rössel, Z. Anal. Chem. 196 (1973), Pages 6 to 15. A chromatographic paper is used that was cut to a length of 450 mm and a width of 30 mm. At each end to which the specimen to be determined is applied, the paper is cut symmetrically to a length of 60 mm and a width of only 12 mm. The specimen will then be applied in the form of a drop (approximately 0.01 ml) in the center at a distance of 50 mm from the tapered end of the paper strip. The chromatographic paper is then chromatographed in a suitable vessel. According to Rössel, a cylindrical glass vessel is expediently used that has a diameter of 250 mm, a height of 500 mm, with a ground-in lid. In this glass vessel, the chromatographic strip is suspended in corresponding holding arrangements in such a manner that it projects into the solvent which is situated at a height of approximately 10 mm on the bottom of the vessel.

Required Solutions

1. Methanol Solvents

Solution I: 133.3 g trichloroacetic acid and 30.0 ml 25% ammonia are filled up to the amount of 1,000 ml with distilled water.

Solution II: 200 ml of 96% crystallizable acetic acid are filled up with 800 ml distilled water.

For producing the methanol solvent, 120 ml methanol, 30 ml of solution I and 10 ml of solution II are mixed with one another.

2. Spray Solutions

Molybdate Spray Solution 40 g sodium molybdate dihydrate and 50 g ammonium nitrate are dissolved in distilled water and are filled up to the amount of 1,000 ml. This solution is then poured into 100 ml concentrated nitric acid.

Reduction Spray Solution 300 g sodium pyrosulfite and 10 g sodium sulfite and 2 g methol (N-methyl methyl amino phenol, Agfa Co.) are dissolved in 1,000 ml distilled water and, if necessary, are filtered.

Sodium molybdate solution for colorimetry 125 g sodium molybdate-dihydrate were dissolved in 1000 ml distilled water.

Hydrazin Sulfate Solution for Colorimetry 0.3 g hydrazin sulfate are dissolved in distilled water. This solution is always started fresh.

Perchloric acid (70%).

Implementation of Analysis 1 drop of approximately (0.01 ml) is applied to the chromatography paper as described above. The chromatograph strip will then be mounted in the vessel in such a manner that it reaches into the methanol solvent which is situated at a height of approximately 10 mm on the vessel bottom. The chromatographing expediently takes place at a constant temperature (ambient temperature) until the solvent front has risen to approximately 5 cm below the upper edge of the chromatography paper.

This takes approximately 16 hours. Then the chromatogram is taken out of the vessel, is dried well in the drying chamber at approximately 60° to 80° C., is then sprayed by means of a spraying bottle with the molybdate spraying solution to barely a uniform moisture, and is then again dried well for approximately 5 to 10 minutes. Then spraying takes place in the same manner by means of the reduction spraying solution and there is another drying. The phosphates now appear on the paper as blue dots. The phosphate dots are then cut out in such a manner that all phosphate is included but no superfluous paper is also cut. An approximately patch-sized piece without any phosphate is also cut out for a blank test and is subjected to the same treatment as all the others. (It is expedient to let another chromatographic paper run along in parallel as a blank test during the chromatographing). The cut-out patches are then fed into 50 ml—graduated flasks, are mixed with 4 ml of the concentrated perchloric acid, and for the destruction of the paper, are heated without any placing of the ground-in stopper on the sand bath at a moderate temperature until, after a brisk boiling of the acid, which has become dark brown, a clarification has taken place and the acid as become white to light yellow. After diluting the acid solution to approximately 25 ml, the graduated flasks are placed in a drying chamber for 1 hour at 90° C. for hydrolysis.

The evaluation of the separated phosphates takes place colorimetrically. For this purpose, commercially available photometers may be used. 1 ml of the sodium molybdate solution are added to the cooled graduated flasks for the purpose of colorimetry and 1 ml of the hydrazin sulfate solution is added for the purpose of colorimetry as the reduction solution. The graduated flasks are then placed in the drying chamber for another 25 minutes at 90° C. The blank value will now appear in white to light yellowish. After the cooling and the filling-up with distilled water, the penetrability is determined. From the extinction of the individual samples, relative to the sum of the extinctions, the phosphate proportion of the individual patches and thus the phosphate distribution in percent can be determined according to $$n\ \%\ P_2O_5 = (100 \times E : \Sigma E).$$

Method d) Determination of the Fluoride Content in the Specimen by Means of a Fluoride Electrode Which Responds Selectively to Fluoride before and after the Hydrolysis. The comparison of both numerical values permits the determination of the proportion of fluoride not bound to phosphorus in the produced monofluorophosphate.

The fluoride electrode 157205 of the firm Dr. W. Ingold AG, Urdorf-Zürich, Switzerland, which responds selectively to fluoride was used.

Solutions required for carrying out the determination of fluoride:
Fluoride parent solution
  aqueous solution with 2.2101 g sodium fluoride per liter. Such a solution contains exactly 1 mg fluoride per ml.
Tiron buffer solution
  33.2 g. Tiron (Merck Co., Darmstadt) (Tiron=catechol disulfonic acid—3.5—disodium salt monohydrate) 102.06 g sodium acetate 58.44 g sodium chloride 15.01 g acetic acid (15.8 ml) filled up to 1 liter with distilled water.

First, a calibration curve was established. For this purpose, 0.1 ml of the fluoride parent solution were pipetted into a 100 ml graduated flask. Then a little distilled water was added and several granules of hydroxyl ammonium chloride were added. Then phenol phthalein was added and caustic potash solution was added until the solution had a slightly pink color. The pH-value was approximately 8. Then 10 ml of the above-described Tiron buffer solution was added into the graduated flask and the graduated flask was then filled up to the mark with distilled water. The flask content was then filled into a dry 150 ml beaker (without rinsing). Then the fluoride electrode was dipped into the solution and was moved back and forth in the solution. After the adjustment of the equilibrium, that is, after approximately 5 minutes, the display of a pH-meter, to which the fluoride electrode was connected, which is indicated in millivolt is read and recorded.

In the same manner, a 1 ml specimen and a 10 ml specimen were removed from the fluoride parent solution and were examined as described above. A calibration curve was established by entering the measured values in millivolt against the content of fluoride in the respective used solutions in milligram on logarithmic millimeter graph paper.

Determination of the Fluoride Content in Sample Solutions before the Hydrolysis:

The process product to be examined is dissolved in distilled water. A precisely determined volume, usually 1 to 50 ml, was removed from the obtained sample solution. The fluoride content of the sample was to amount to between 0.1 and 10 mg of fluoride. The removed sample was treated as above; that is, it was pipetted into a 100 ml graduated flask and was diluted with a little distilled water. Then several granules of hydroxyl ammonium chloride were added and the pH-value was adjusted to approximately 8 by means of caustic potash solution. Then 10 ml of the Tiron buffer solution were added and the graduated flask was filled to the mark with distilled water. Then, without rinsing, the content of the flask was poured into a dry 150 ml beaker. The fluoride electrode was then dipped in and moved back and forth. After 5 minutes, the measured value was read in millivolt and was analyzed by means of the calibration curve.

Determination of the Fluoride Content after Hydrolysis:

An immersion heater distillation apparatus according to Döhr was used, as described in the advertising leaflet *Glastechnische Information fur Labor, Technikum und Betrieb* No. 4 of the firm Glasapparatebau Herbert Miethke, Leverkusen. This apparatus comprises two vessels which are arranged inside one another. The outer vessel is a steam releasing device heated by an immersion heater, and the inner vessel is the reaction vessel. Both vessels are firmly connected with one another by means of a lid. A distillation top is placed on the reaction vessel. The distillation top, in turn, is adjoined by a handle cooler.

For the determination of the fluoride value after the hydrolysis, a precisely weighed quantity of the sample (between approximately 0.3 and approximately 0.4 g) is weighed into a 150 ml beaker. The sample was dissolved in a little added distilled water; 2 ml silver sulfate solution (=0.256 g silver sulfate) as well as 70 ml perchloric acid with 70% in weight $HClO_4$ were added and the mixture was rinsed into the interior vessel of the apparatus. Subsequently, a spatula of sea sand (approximately 3 to 4 g) was added. The outer vessel was then filled to ¾ of the volume with distilled water. A graduated flask which a liter content, into which a little distilled water was added, was placed under the handle cooler in such a manner that the cooler end dipped into the water. Then, by means of the immersion heater, the water contained in the outer vessel was slowly evaporated and the vapor was guided through the sample solution in the inner vessel. The heating was adjusted such that the boiling temperature did not exceed 108° C. The fluorine which from the start existed as fluoride as well as the gradually hydrolyzing fluorine which is first bound to phosphorus are carried over with the water vapor. After approximately 1 hour, the whole fluorine content of the sample was carried over by distillation, and the 1 l flask was almost full. The 1 l graduated flask was then removed from the cooler, the cooler end was rinsed off, and the flask was filled to the mark with distilled water. 25 ml were removed from the flask content and were pipetted into a 100 ml graduated flask. The fluoride was then determined in the manner described above; that is, distilled water and hydroxyl ammonium chloride were added; the pH-value was adjusted and the Tiron buffer solution was added.

By means of the calibration curve, the total content of fluorine in the sample can be determined from the measured millivolt value of the pH meter.

From the comparison of the measured values of the sample before the hydrolysis and after the hydrolysis, the content of fluoride or of fluorine, bound to phosphorus, in the respective sample can then be calculated.

As the result of the comparison of the fluoride content before the hydrolysis and after the hydrolysis, it can therefore be determined how much alkali fluoride is contained in the manufactured alkali monofluorophosphate.

Method e) Ultimate Analysis

This method permits the determination of the atomic ratio of M:P:F.

EXAMPLE 1

112.0 g phosphoric acid (P-content approximately 27.69% which corresponds to an 87.46% acid and 1 mol $H_3PO_4$) were placed in a platinum vat. Then first 407.3 g caustic potash solution (27.55% in weight KOH, corresponding to 2 mol KOH) were added, and subsequently 114.5 g hydrofluoric acid (19.22% in weight HF, corresponding to 1.10 mol HF) were added. The initial atomic ratio of this preparation was therefore K:P:F=2:1:1.10. The mixture was then heated to 350° C. After approximately 1 hour, the reaction mixture was completely crystallized. It was then left for 1 hour at approximately 350° C.

Yield: 176.7 g.

EXAMPLE 2

The method of Example 1 was applied but the used amount of hydrofluoric acid was approximately 109.3 g (corresponding to 1.05 mol HF). The initial atomic ratio in the reaction mixture was therefore K:P:F=2:1:1.05.

Yield: 177.1 g.

EXAMPLE 3

The method of Example 1 was applied but this time the used amount of hydrofluoric acid was 104.1 g (corresponding to 1.00 mol HF), and the initial atomic ratio was therefore K:P:F=2:1:1.00.

Yield: 176.3 g.

EXAMPLE 4

The method of Example 1 was applied but the used amount of hydrofluoric acid was 93.7 g (corresponding to 0.90 mol HF). The initial atomic ratio was therefore K:P:F=2:1:0.90.

Yield: 175.9 g.

Characterization of the Products Obtained According to Examples 1 to 4

All four products are completely soluble in water. The phosphorus used for the reaction and the used potassium are completely present in the products. The distribution of the total phosphorus in the reaction products determined according to method c) resulted in the following values:

TABLE 1

Result of the Quantitative Paper-Chromatographic Analysis of the Reaction Products of Examples 1 to 4

| Product According to Example | Initial Atomic Ratio P:F | Phosphorus Distribution (Atom %) | |
|---|---|---|---|
| | | as $PO_3F^{2-}$ | as $PO_4^{3-}$ |
| 1 | 1:1.10 | 100 | 0 |
| 2 | 1:1.05 | 99 | 1 |
| 3 | 1:1.00 | 98.5 | 1.5 |
| 4 | 1:0.90 | 89 | 11 |

The phosphorus distribution determined by means of method b) is in agreement with the results of testing method c) indicated in Table 1. The testing according to method a) of the four reaction products proved that no fluoride $F^-$ was contained in the products. The Guinier photographs of the products produced according to Examples 1 to 4 illustrate that in each case crystalline dipotassium monofluoromonophosphate $K_2PO_3F$ was created. The purity of the product is particularly high when fluorine that is slightly leaner than stoichiometric is applied.

Analysis according to method e) for the product obtained according to Example 3: $K_2PO_3F$ (molar mass: 176.175)

TABLE 2

Ultimate Analysis for the Product According to Example 3.

| | K | P | F |
|---|---|---|---|
| found | 44.80 | 17.56 | 10.70 |
| calculated | 44.39 | 17.58 | 10.78 |

Table 2 indicates an atomic ratio of K:P:F=2.02:1.0:0.99. The results of the other methods of analysis are confirmed by this ultimate analysis.

EXAMPLE 5

First a solution was prepared of 174.2 g (1 mol) dipotassium hydrogen phosphate in 180 g distilled water. First 112.0 g phosphoric acid (P-content approximately 27.65% in weight, corresponding to 1 mol $H_3PO_4$) were entered into this solution; then 227.2 g caustic potash solution (content of KOH approximately 49.4% in weight, corresponding to 2 mol KOH), and finally 112.9 g hydrofluoric acid (HF-content approximately 39.0 in weight, corresponding to 2.2 mol HF). The mixture was then heated to 320° C. until it is completely crystallized, and is then held for another hour at this temperature.

Yield: 351.4 g.

The product consisted of pure crystalline $K_2PO_3F$, as demonstrated by the methods of analysis a), b), c) as well as Guinier photographs.

EXAMPLE 6

Example 6 was carried in equipment according to FIG. 1.

A caustic potash solution containing 45% in weight KOH was charged into storage vessel 1; a phosphoric acid containing 85.7% in weight $H_3PO_4$ was charged into storage vessel 2; and an aqueous hydrofluoric acid containing 40% in weight HF was charged into storage vessel 3. The valve 4 was opened and 249.5 g of the caustic potash solution was allowed to flow into the mixing vessel 7. After the closing of valve 4, valve 5 was opened and 114.5 g of the ortho-phosphoric acid solution was added. After the closing of valve 5, valve 6 was opened, and 53.5 g of the hydrofluoric acid solution was charged into the mixing vessel.

When a quantitative reaction to dipotassium monofluoromonophosphate is assumed, this corresponds to a molar ratio of water to the end product $K_2PO_3F$ of 13.2:1 (corresponding to an aqueous solution of $K_2PO_3F$ with 57.5% in weight of water).

The atomic ratio of K:P:F in the reaction mixture was 2:1:1.07. The temperature in the reaction mixture rose to approximately 70° C. The freshly prepared reaction mixture of a temperature of 70° C. was then applied to the aluminum plate 10 by way of the valve 8 and the pipe 9. It flowed uniformly, slowly and in a thin layer from the aluminum plate 10 onto the roller surface of the roller 11 which was heated by means of thermo-oil to a temperature of approximately 230° to 260° C. As soon as the solution arrives on the roller surface, the water contained in it evaporated. It is assumed that now also the starting compounds react with one another while forming the desired monofluorophosphate. The resulting vapor, which contained low concentrations of hydrogen fluoride, was discharged by way of a fume hood into a gas washer.

The roller was driven by means of a continuously controllable electric motor with a chain. The reaction mixture remained on the roller surface for the duration of ⅔ of a rotation—approximately 30 to 40 seconds. The potassium monofluorophosphate which was formed and baked onto the surface of the roller in the course of the drying operation was then scraped off the surface of the roller by means of the blade 12. By way of the conveyor belt 13, the product, which contained no more then 0.7% in weight of water, was placed in a drying oven and was dried there for the second time for a duration of 20 minutes at 320° C. Then it was transferred from the drying oven by way of the pipe 15 into a storage vessel 16.

The analysis was carried out according to method d) and e). The ratio of fluoride before the hydrolysis to total contained fluorine, thus fluoride after the hydrolysis, showed that the product consisted of approximately 95% in weight of dipotassium monofluoromonophosphate.

TABLE 3

| Ultimate Analysis for the Product of Example 6 | | | |
|---|---|---|---|
| | K | P | F |
| Found | 45.1 | 17.4 | 9.9 |
| Calculated | 44.39 | 17.58 | 10.78 |

The ultimate analysis confirms the result of the analysis according to method d).

We claim:

1. A method of manufacturing an alkali monofluorophosphate corresponding to the formula:

$$M_2PO_3F \qquad (I)$$

wherein M represents a cation of a Group I metal, said method comprising:

forming a reaction mixture comprising alkali metal cations M, phosphate P, fluoride F and water wherein the molar ratio of M:P:F is $(2\pm0.1):(1\pm0.05):(1\pm0.1)$, and the molar ratio of water:P is at least 1:1;

heating said reaction mixture to a temperature of from 150° C. to 400° C., whereby said alkali monofluorophosphate of formula (I) is formed as a reaction product while water is evaporated, and isolating the alkali monofluorophosphate reaction product.

2. A method according to claim 1, wherein M represents an alkali metal cation selected from the group consisting of potassium, cesium and rubidium, and wherein the molar ratio of M:P:F in said reaction mixture is $(2\pm0.05):(1\pm0.05):(1\pm0.1)$.

3. A method according to claim 2, wherein the molar ratio of M:P:F in said reaction mixture is 2:1:(1 to 1.1).

4. A method according to claim 1, wherein the molar ratio of water:P in said reaction mixture is from 2:1 to 100:1.

5. A method according to claim 4, wherein said reaction mixture is an aqueous solution.

6. A method according to claim 1, wherein said phosphate is introduced into said reaction mixture in the form of phosphoric acid.

7. A method according to claim 1, wherein M represents a potassium cation.

8. A method according to claim 7, wherein said fluoride is introduced into said reaction mixture in the form of aqueous hydrofluoric acid.

9. A method according to claim 7, wherein said potassium cation is introduced into said reaction mixture in the form of a caustic potash solution.

10. A method according to claim 1, wherein said reaction mixture is formed by mixing phosphoric acid, caustic potash solution and aqueous hydrofluoric acid.

11. A method according to claim 10, wherein prior to said heating step said reaction mixture is maintained at a sufficient temperature to prevent precipitation of solids.

12. A method according to claim 11, wherein said reaction mixture is heated in said heating step to a temperature of at least 200° C.

13. A method according to claim 12, wherein said reaction mixture is heated in said heating step to a temperature in the range from 220° C. to 350° C.

14. A method according to claim 1, wherein said heating step is effected by introducing the reaction mixture onto a surface of a heatable form and heating the form.

15. A method according to claim 14, wherein said reaction mixture is applied to the surface of a roller and is heated on the surface of the roller to a temperature of at least 150° C., and the reaction product which forms as water evaporates is removed from the surface of the roller by means of a self-supporting blade.

16. A method according to claim 15, wherein said reaction mixture is heated on the surface of the roller to a temperature in the range from 200° C. to 400° C.

17. A method according to claim 16, wherein said reaction mixture is heated on the surface of the roller to a temperature in the range from 220° C. to 350° C.

18. A method according to claim 1, further comprising subjecting the isolated reaction product to a subsequent drying treatment at a temperature in the range from 280° C. to 400° C.

19. A method according to claim 18, wherein the isolated reaction product is subjected to a subsequent drying treatment at a temperature in the range from 300° C. to 350° C.

* * * * *